United States Patent
Prange

(10) Patent No.: US 7,972,719 B2
(45) Date of Patent: Jul. 5, 2011

(54) BATTERY ASSEMBLY HAVING SLIM BATTERY TRAY

(75) Inventor: Rolf Prange, Iserlohn (DE)

(73) Assignee: EH Europe GmbH, Zurich (CH)

( * ) Notice: Subject to any disclaimer, the term of this patent is extended or adjusted under 35 U.S.C. 154(b) by 880 days.

(21) Appl. No.: 11/973,332

(22) Filed: Oct. 5, 2007

(65) Prior Publication Data

US 2008/0182161 A1      Jul. 31, 2008

Related U.S. Application Data

(60) Provisional application No. 60/850,157, filed on Oct. 5, 2006.

(51) Int. Cl.
    *H01M 2/10*    (2006.01)
(52) U.S. Cl. .......................................................... 429/99
(58) Field of Classification Search ...................... 429/99
    See application file for complete search history.

(56) References Cited

U.S. PATENT DOCUMENTS

| | | | |
|---|---|---|---|
| 754,858 A | 3/1904 | Edison | 429/99 |
| 1,982,801 A | 12/1934 | Gerking | 429/99 |
| 3,664,877 A | 5/1972 | Shaw | 136/171 |
| 3,692,588 A | 9/1972 | Chamodon | 429/148 |
| 4,020,244 A * | 4/1977 | Selinko | 429/100 |
| 4,113,926 A | 9/1978 | McBrien | 429/99 |
| 4,317,497 A | 3/1982 | Alt et al. | 180/68.5 |
| 4,957,829 A * | 9/1990 | Holl | 429/99 |
| 5,037,711 A | 8/1991 | Bonnaud et al. | 429/156 |
| 5,403,679 A * | 4/1995 | Stone | 429/99 |
| 5,766,801 A | 6/1998 | Inoue et al. | 429/99 |
| 2002/0093246 A1 | 7/2002 | Takahashi | |
| 2007/0009788 A1* | 1/2007 | Indik | 429/100 |
| 2007/0278915 A1* | 12/2007 | Conrardy et al. | 312/257.1 |

OTHER PUBLICATIONS

EP Extended European Search Report. Appln. No. EP 07 019 570.6 Date of Mailing: Dec. 20, 2007.
DE 20 2005 005018 U1 (Siemens Ag [DE]), filed Aug. 10, 2006.
FR 2 344 133 A (Accumulateurs Fixes [FR]), filed Oct. 7, 1977.

* cited by examiner

*Primary Examiner* — Patrick Ryan
*Assistant Examiner* — Muhammad Siddiquee
(74) *Attorney, Agent, or Firm* — Jonathan A. Bay

(57) ABSTRACT

A battery assembly (10) has a series of rectangular cells (20) and a square-U shaped tray (14) to support the cells (20) in series, with bottoms (24) coplanar and adjacent sides parallel. The tray (14) has spaced arms (43) for opposing the endmost ones of the series of cells (12) interconnected by a rigid web (41) that provides a generally flat seating surface for the cell bottoms (24). The web (41) has longitudinal tracks (49) which raise above the seating surface of the wen (41) and which extend beneath all the cell bottoms (24). The cell bottoms (24) have counterpart longitudinal channels (52) for self-assembling with the tracks (49) of the web (41) and provide properly aligned seating of the cell bottoms (24) by disallowing lateral displacement but allowing longitudinal sliding order to form as dense as a single-file line-up (12) as possible. The tracks (49) also serve to stiffen the web (41) against sagging or twisting.

17 Claims, 3 Drawing Sheets

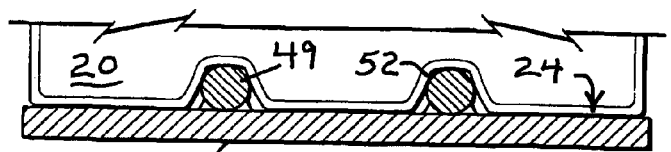
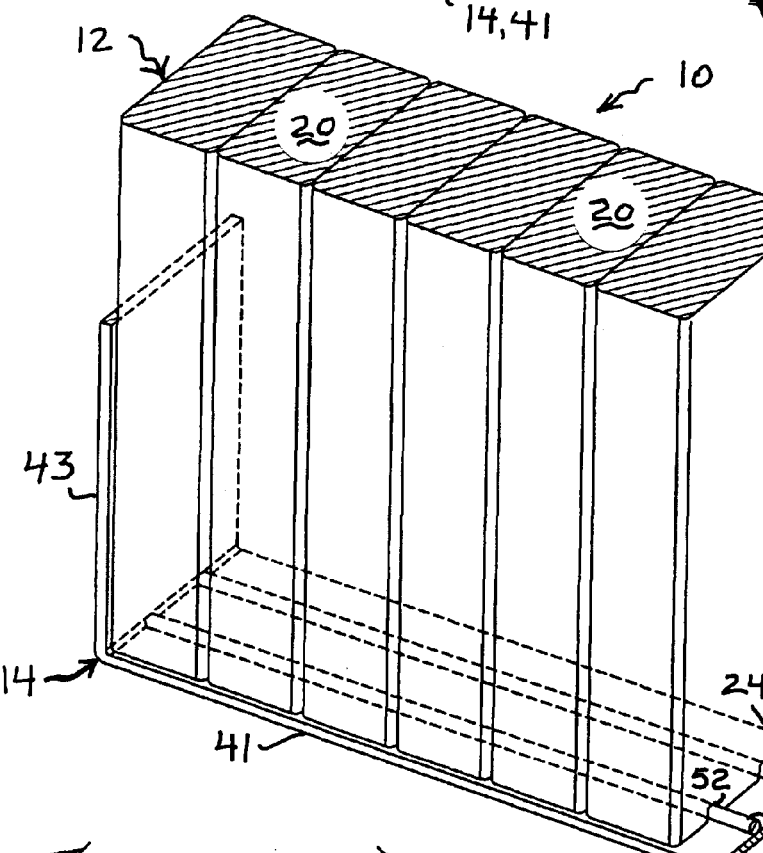
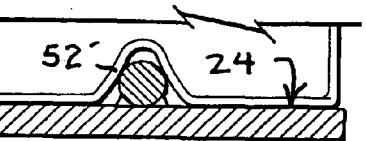

BATTERY ASSEMBLY HAVING SLIM BATTERY TRAY

CROSS-REFERENCE TO PROVISIONAL APPLICATION(S)

This application claims the benefit of U.S. Provisional Application No. 60/850,157, filed Oct. 5, 2006.

BACKGROUND AND SUMMARY OF THE INVENTION

The invention relates to electrical current producing apparatus and, more particularly, to cell assembly support for a plurality of unit cells.

It is an object of the invention that the battery assembly comprising the cell assembly and supporting structure therefor (eg., the tray) have the overall dimensions as close as possible to the sum of the unit cells constituting it in order to optimize higher accumulation capacities and/or voltages in the available space.

It is an alternate object of the invention to provide such a battery assembly with a self-aligning system between the bottoms of the cells and the support surface therefor of the tray.

It is an additional object of the invention to configure such a self-aligning system such that the cells self-align themselves relative to the tray through self-assembly by virtue of inverted-V shaped or inverted-U shaped docking recesses in the bottoms of the cells (or other like shapes), for which the tray has counterpart formations for docking or interposing therein.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

FIG. 3 is an enlarged scale detail view of FIG. 1, with portions broken away, and other portions shown in hidden lines;

FIG. 4 is an enlarged scale elevational view, partly in section, taken in the direction of arrows IV-IV in FIG. 3; and FIG. 5 is an elevational view, partly in section, comparable to FIG. 4 except showing an alternate embodiment in accordance with the invention.

DETAILED DESCRIPTION OF THE PREFERRED EMBODIMENTS

Figure 1:
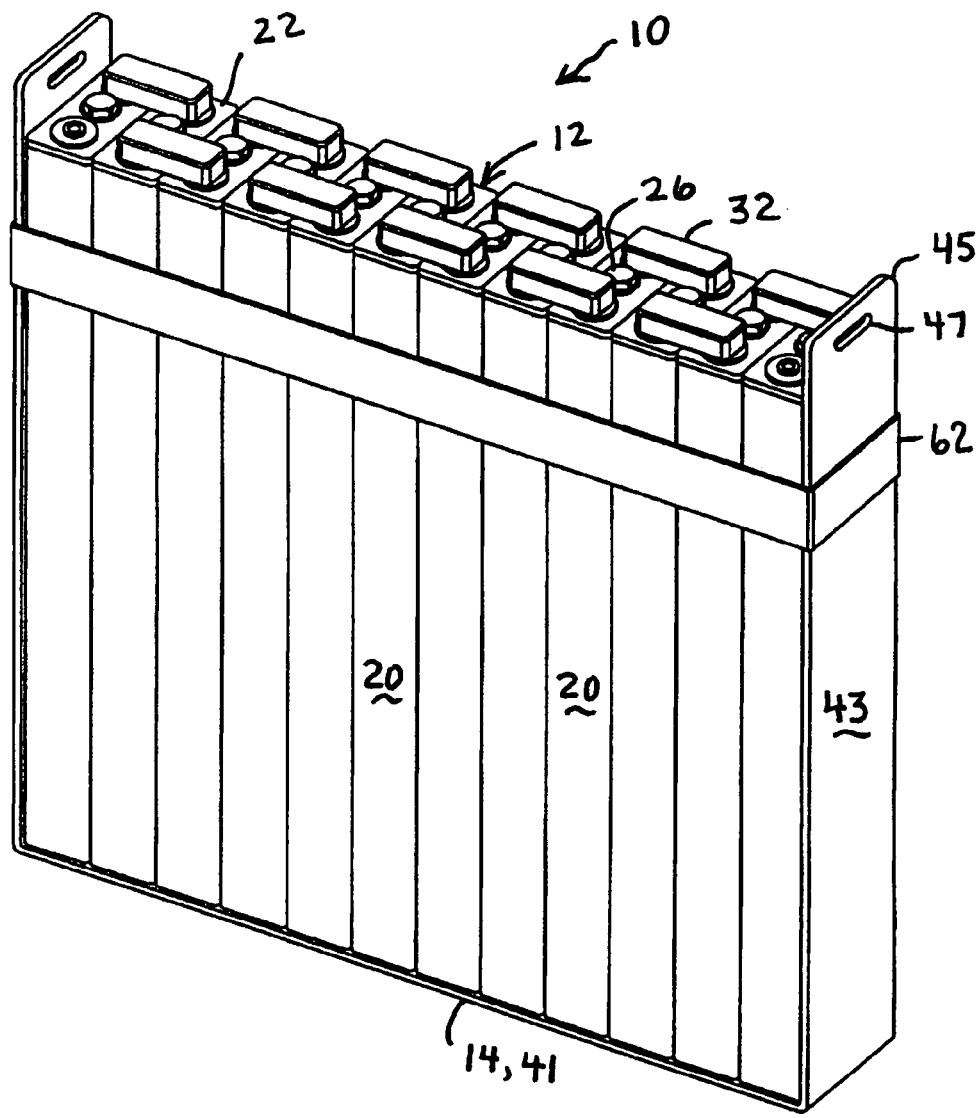
FIG. 1 is a perspective view of a battery assembly in accordance with the invention having a slim battery tray in accordance with the invention.
Figure 2:
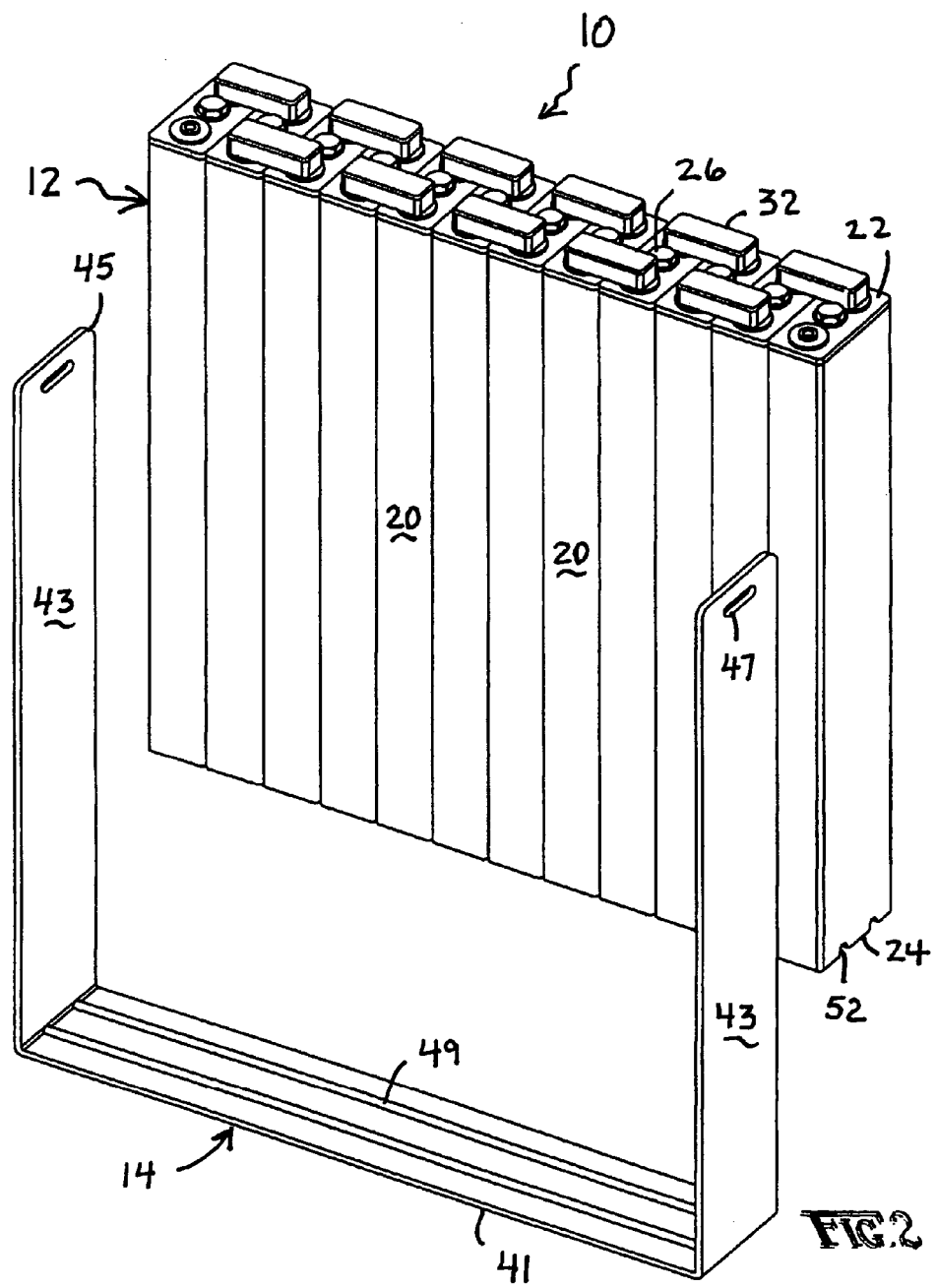
FIG. 2 is a perspective view comparable to FIG. 1 except not only showing the slim battery tray in accordance with the invention and an assembly in accordance with the invention of unit cells but also showing the two apart from each other.

FIGS. 1 through 3 show a battery assembly 10 in accordance with the invention comprising not only an assembly 12 in accordance with the invention of unit cells 20 but also a slim battery tray 14 in accordance with the invention.

The assembly 12 of unit cells 20 comprises a plurality of columnar, unit cells 20. The columnar unit cells 20 are presumptively identical—presumptively even removable for replacement by a fresh counterpart—and individually are rectangular prisms for which the cases thereof (eg., containers or baths) have elongated broad sides extending between elongated narrow sides collectively bracketed between top and bottom rectangular ends 22 and 24, respectively. Each top end 22, which may be a lid, is provided with both the positive and negative terminal therefor as well as perhaps an optional plug 26 (which may furthermore be configured in service as a valve or relief to relieve pressure). Select terminals of cells 20 are tiled together by intercellular connectors 32 in an alternating pattern as shown. In the battery assembly 10 as a whole, the unit cells 20 are stood upright in a single file, broad-side to broad-side, and clamped by the slim tray 14 in accordance with the invention.

Preferably the inventive slim tray 14 has a square-U shape as shown. The inventive tray 14 can be constructed of any suitable material including without limitation metallic stock. As shown in the drawings, the slim tray 14 comprises a bottom web 41 flanked between opposite upright arms 43. In other words, the slim tray 14 is characterized by the absence of broad side-panels that fill-in between the span of the upright arms 43 (eg., there is a void between the arms 43). The upright arms 43 terminate in extension portions 45 which over-extend beyond the plane of the unit cells 20's top ends 22 and which are formed with apertures 47 for carrying to, setting in, lifting out and/or mounting to the end-use environment, whether that be a vehicle or rack for float service (neither vehicle nor rack shown).

The bottom web 41 is depicted with parallel tracks 49 extending straight between the flanking arms 43, which tracks not only serve to stabilize the bottom ends 24 of the cells 20 in position as to be described more particularly below but perhaps also serve to stiffen the bottom web 41 against contortion, such as sagging and/or twisting. The drawings show one example way of producing the tracks 49 in accordance with the invention, as by the brazing or otherwise affixing of metallic rod stock on a metallic-stock bottom web 41 as shown. Optionally the tracks 49 can be produced or formed by alternative means including without limitation by being produced as indented creases or pleats (not shown) in metallic-stock webs 41 if such were desired.

The bottom web 41 and flanking arms 43 can be produced from a monolithic piece of flat, metallic sheet or plate stock shaped to form by a brake press or stamping operation and the like. Alternatively, the bottom web 41 and flanking arms 43 can be assembled together from three separate pieces of stock material. Either way, the bottom web 41 can have a different thickness from that of the flanking arms 43, there being no requirement of uniform thickness among the web 41 and arms 43. For example and without limitation, the web 41 can have a relatively thicker gauge (eg., thickness) relative to that of the arms 43, which can be minimized to a substantially thin measure. That way, the web 41 in conjunction with the stiffening provided by the tracks 49 (or pleats, not shown) can be designed for a high degree of stiffness (or low degree of flexibility) while the bending stiffness (or flexibility) or the arms 43 is deemed unimportant, it only being important that the arms 43 have sufficient tensile strength to carry (eg., support) the weight of the assembly 12 of unit cells 20 (in actuality, sufficient tensile strength to carry or support half the weight of the assembly 12 of unit cells 20, plus additional strength according to a selected safety or "over-design" factor).

Each unit cell 20's bottom end 24 has a pair of complementary channels 52 recessed therein to accommodate the tracks 49 of the tray 14's bottom web 41. As shown better by any of FIGS. 3 through 5, the channels 52 and tracks 49 match in order to lock-in each unit cell 20's positional stability relative the tray 14's bottom web 41. The battery assembly 10 as a whole furthermore includes an encircling band 62 which cinches tight around the upper margin of the square-U shaped tray 14 and single-file line-up or assembly 12 of unit cells 20. Suitable banding material includes without limitation ribbon stock or adhesive tape and the like.

It is a design choice to have each unit cell 20's side panels (ie., case's side panels) smooth—that is, without features for accommodating positional stabilization—in order to pack the unit cells 20 in as dense as linear or array formations as possible.

Conversely, it is a design advantage to form the bottom panel 24 of every one of unit cell 20's case (eg., container or bath) with channels 52 because, within the interior of the unit cells 20 case, such channels 52 are ridges relative the otherwise planar bottom of the case (this is not illustrated). From the point of view of inside the interior of the case, such ridges function to prop (or stand-off) the unit cell 20's positive and negative plates by a small gap away from the otherwise planar bottom of the case. This is beneficial for allowing circulation of electrolyte underneath the plates or else, among other beneficial reasons, for gapping each plate's bottom margin out of any collection of sediment on the bottom (not illustrated). The circulation underneath the bottom margins of the unit cell 20's plates (again, not illustrated) might be electrically-charged material and/or heat (thermal gradient) material.

In other words, keeping each unit cell 20's side panels smooth promotes dimensional compactness. Conversely, forming channels 52 in each unit cell 20's bottom panel 24 provides operational benefit with insignificant loss of compactness. Indeed, by design choice, it arguably is the best design to provide interior stand-offs on each unit cell 20's bottom panel 24 in order to achieve the benefits in the interior of the case that such provide. Therefore, forming each unit cell 20's bottom panel 24 with the exterior channels 52 (as shown) is taking opportune advantage of that circumstance for a second advantage, namely, for enhancing positional stability on the web 41 of the tray 14 in the manner of and without limitation the tracks 49.

FIGS. 4 and 5 better show that the channels 52 or 52' in the bottoms of the cells 20 can be produced in any of inverted-U shapes 52 (ie., FIG. 4) or inverted-V shapes 52' (ie., FIG. 5) for sufficiently accommodating the tracks 49 of the tray 14's web 41. More positive locking between the cells 52 and web 41 can be attained and without limitation by forming the tracks with a mushroom-shaped (or barbed) profile and then correspondingly shaping the channels with a corresponding-matching mushroom-shaped (or whatever) profile (none of the foregoing is shown).

Reference directions such as top and bottom, or inverted and upper, have been used for convenience in this description as a matter of relative orientation, and otherwise do not impose any limitations on how the battery assembly 10 may be oriented in use.

Given the foregoing, it is an improvement over a shortcoming of the prior art whereas previously battery fit has been specified according to battery-case (ie., in contrast to cell case) or battery-tray size, the inventive slim battery tray 14 combined with the inventive cells 20 allows designers to specify battery fit according to cell size and not battery tray (or battery case) size.

The various objects and aspects of the invention are generally provided by a battery assembly 10 comprising a series 12 of rectangular cells 20 and a U-shaped tray 14 to support the cells 20 in series, with bottoms 24 coplanar and adjacent sides parallel. The tray 14 comprises spaced arms 43 interconnected by a rigid web 41 providing a generally flat seating surface upon which the cell bottoms 24 are seated and being longitudinally elongated such that the spaced arms 43 oppose the endmost ones of the series 12 of cells 20.

The web 41 is further being provided with a docking provision 41 that extends longitudinally beneath the bottoms 24 of all the cells 20. The bottoms 24 of the cells 20 are provided with counterpart docking provisions 52 for self-assembling with the docking provision 49 of the web 41 and thereby provide properly aligned seating of the cell bottoms 24 in series on the web 41 of the tray 14.

It is preferred if the docking provision 49 of the web 41 as well as the counterpart docking provisions 52 of the cell bottoms 24 comprise laterally-spaced abutment surfaces that mutually cooperate in pairs for disallowing lateral displacement of the cell bottoms 24 when properly seated on the web 41 of the tray 41.

It is preferred conversely if the docking provision 49 of the web 41 as well as the counterpart docking provisions 52 of the cell bottoms 24 are elongated along straight longitudinal axes in order to allow longitudinal, sliding displacement the cell bottoms 24 even when properly seated relative to a properly seated lateral-alignment of the cell bottoms 24 on the web 41 of the tray 14.

Another aspect of the invention involves providing either the docking provision 49 of the web 41 or the counterpart docking provisions 52 of the cell bottoms 24 as a laterally-sloping insert (eg., 49) as the other is provided as a laterally-sloping recess (eg., 52) in order to provide a self-enabling, progressively correcting alignment during the seating of the cell bottoms 24 on the web 41 of the tray 14.

One design preference has the docking provision 49 of the web 41 comprising a track provision 49 that raises out of the seating surface thereof and which extends longitudinally beneath the bottoms 24 of all the cells 20. Accordingly, the counterpart docking provisions 52 of the cell bottoms 24 comprise matching channels 52 formed therein for self-enabling the interposing of the track provision 49. That way, the track provision 49 not only provides properly aligned seating of the cell bottoms 24 in series on the web 41 of the tray 14 but also stiffens the web 41 against sagging.

Another design preference has the web 49 of the tray 14 provided with a second track provision 49, such that both track provisions 49 extend along longitudinally-parallel laterally-spaced axes. Accordingly, the cell bottoms 24 are provided with a second matching channel 52, such that both channels 52 of each cell bottom 24 extend along matching longitudinally-parallel laterally-spaced axes. Here, the tracks 49 not only serve to stiffen the web 41 against sagging but also against twisting.

It is optional that the web 41 of the tray 14 comprises a strip of flat metal sheet or plate and that the track provisions 49 comprise lengths of slender metal track 49 secured fast to the seating surface of the web 41. The lengths of slender metal track 49 can be secured fast to the seating surface of the metal web 41 by any of welding, brazing or soldering. The lengths of slender metal track 49 can comprise lengths of metal rod or bar 49. All that is needed of the channels 52 in the cell bottoms 24 is that they can be formed in any of inverted-U or inverted-V shapes, and so on.

It is preferred if the series 12 of rectangular cells 20 form a single-file line-up and, that way, they have one and another laterally-spaced sides respectively coplanar in one and another laterally-spaced planes. The laterally-spaced sides are preferably flat in order that the battery assembly 10 can form as dense as an array formation as possible with other like battery assemblies.

The web 41 of the tray 14 extends laterally between spaced edges which are optimally coplanar with the one and another laterally-spaced planes, again in order that the battery assembly 10 can form as dense as an array formation as possible with other like battery assemblies.

The arms 43 of the tray 14 are desirably produced of flat sheet or plate stock and extend laterally between spaced edges that are optimally coplanar with the one and another laterally-spaced planes in order, again, that the battery assembly 10 can form as dense as an array formation as possible with other like battery assemblies.

As stated above, preferably the series 12 of rectangular cells 20 form a single-file line-up and, that way, they also have one and another longitudinally-spaced sides, which are flat, as for abutting the longitudinally-spaced side of a like cell 20 at an intercellular plane or one of the arms 43 in order to form as dense as a linear formation as possible.

The battery assembly 10 preferably further comprises a band 62 encircling the arms 43 of the tray 14 and series cells 12 at an elevation intermediate the tops 22 and bottoms 24 of the cells 20 in order to cinch the battery assembly 10 together.

The arms 43 of the tray 14 preferably terminate in extension portions 45 which extend upwardly over a plane containing the tops 22 of the cells 20 and such they are provided with provisions 47 adapted for the battery assembly 10 to be carried around by or alternatively to be mounted in an end-use mounting environment. One option for the extension portions 45 is to provide them with apertures 47 for enabling the battery assembly 10 to be carried around by or alternatively to be mounted in the end-use mounting environment. An advantage of the simplicity of the apertures 47 is that, they also allow the battery assembly 10 to form as dense as an array formation as possible with other like battery assemblies.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

REFERENCE LIST (NUMERICAL)

10, battery assembly
12, cell assembly
14, tray
20, unit cell (bath)
22, top end, cell
24, bottom end, cell
26, plug, of cell
32, intercellular connectors
41, web, of tray
43, arm(s), upright, of tray
45, extensions, of tray arms
47, apertures, in tray arm extensions
49, tracks, of tray's web -continued 52, channels, in cell bottoms
62, band, encircling

REFERENCE LIST (ALPHABETICAL)

apertures, in tray arm extensions, 47
arm(s), upright, of tray, 43
band, encircling, 62
battery assembly, 10
bottom end, cell, 24
cell assembly, 12
channels, in cell bottoms, 52
extensions, of tray arms, 45
intercellular connectors, 32
plug, of cell, 26
top end, cell, 22
tracks, of tray's web, 49
tray, 14
unit cell (bath), 20
web, of tray, 41

What is claimed is:

1. A battery assembly (10) comprising:
a series (12) of rectangular cells (20), and
a U-shaped tray (14) to support the cells (20) in series, with bottoms (24) coplanar and adjacent sides parallel, said tray (14) comprising spaced arms (43) interconnected by a rigid web (41) providing a generally flat seating surface upon which said cell bottoms (24) are seated and being longitudinally elongated such that the spaced arms (43) oppose the endmost ones of the series (12) of cells (20),
said web (41) further being provided with a docking provision (41) that extends longitudinally beneath the bottoms (24) of all said cells (20),
said bottoms (24) of the cells (20) being provided with counterpart docking provisions (52) for self-assembling with the docking provision (49) of the web (41) and thereby provide properly aligned seating of the cell bottoms (24) in series on the web (41) of the tray (14).

2. The battery assembly (10) of claim 1 wherein the docking provision (49) of the web (41) as well as the counterpart docking provisions (52) of the cell bottoms (24) comprise laterally-spaced abutment surfaces that mutually cooperate in pairs for disallowing lateral displacement of the cell bottoms (24) when properly seated on the web (41) of the tray (41).

3. The battery assembly (10) of claim 2 wherein the docking provision (49) of the web (41) as well as the counterpart docking provisions (52) of the cell bottoms (24) are elongated along straight longitudinal axes in order to allow longitudinal, sliding displacement the cell bottoms (24) even when properly seated relative to a properly seated lateral-alignment of the cell bottoms (24) on the web (41) of the tray (14).

4. The battery assembly (10) of claim 1 further comprising providing either the docking provision (49) of the web (41) or the counterpart docking provisions (52) of the cell bottoms (24) as a laterally-sloping insert (eg., 49) as the other is provided as a laterally-sloping recess (eg., 52) in order to provide a self-enabling, progressively correcting alignment during the seating of the cell bottoms (24) on the web (41) of the tray (14).

5. The battery assembly (10) of claim 1 wherein the docking provision (49) of the web (41) comprises a track provision (49) that raises out of the seating surface thereof and which extends longitudinally beneath the bottoms (24) of all said cells (20), and
wherein the counterpart docking provisions (52) of the cell bottoms (24) comprise matching channels (52) formed therein for self-enabling the interposing of the track provision (49), wherein the track provision (49) not only provides properly aligned seating of the cell bottoms (24) in series on the web (41) of the tray (14) but also stiffens the web (41) against sagging.

6. The battery assembly (10) of claim 5 wherein the web (49) of the tray (14) is further provided with a second track provision (49), which track provisions (49) extend along longitudinally-parallel laterally-spaced axes, and wherein the cell bottoms (24) are further provided with a second matching channel (52), which channels (52) of each cell bottom (24) extend along matching longitudinally-parallel laterally-spaced axes, wherein the tracks (49) not only serve to stiffen the web (41) against sagging but also against twisting.

7. The battery assembly (10) of claim 6 wherein the web (41) of the tray (14) comprises a strip of flat metal sheet or plate and wherein the track provisions (49) comprise lengths of slender metal track (49) secured fast to the seating surface of the web (41).

8. The battery assembly (10) of claim 7 wherein the lengths of slender metal track (49) are secured fast to the seating surface of the metal web (41) by welding, brazing or soldering.

9. The battery assembly (10) of claim 7 wherein the lengths of slender metal track (49) comprise lengths of metal rod or bar (49).

10. The battery assembly (10) of claim 6 wherein the channels (52) in the cell bottoms (24) are formed in any of inverted-U or inverted-V shapes.

11. The battery assembly (10) of claim 1 wherein the series (12) of rectangular cells (20) form a single-file line-up and have one and another laterally-spaced sides respectively coplanar in one and another laterally-spaced planes, wherein the laterally-spaced sides are flat in order that said battery assembly (10) can form as dense as an array formation as possible with other like battery assemblies.

12. The battery assembly (10) of claim 11 wherein the web (41) of the tray (14) extends laterally between spaced edges that are coplanar with said one and another laterally-spaced planes in order that said battery assembly (10) can form as dense as an array formation as possible with other like battery assemblies.

13. The battery assembly (10) of claim 12 wherein the arms (43) of the tray (14) are produced of flat sheet or plate stock and extend laterally between spaced edges that are coplanar with said one and another laterally-spaced planes in order that said battery assembly (10) can form as dense as an array formation as possible with other like battery assemblies.

14. The battery assembly (10) of claim 1 wherein the series (12) of rectangular cells (20) form a single-file line-up and have one and another longitudinally-spaced sides, wherein the longitudinally-spaced sides are flat for abutting the longitudinally-spaced side of a like cell (20) at an intercellular plane or one of the arms (43) in order to form as dense as a linear formation as possible.

15. The battery assembly (10) of claim 14 further comprising a band (62) encircling the arms (43) of the tray (14) and series cells (12) at an elevation intermediate the tops (22) and bottoms (24) of the cells (20) in order to cinch the battery assembly (10) together.

16. The battery assembly (10) of claim 1 wherein the arms (43) of the tray (14) terminate in extension portions (45) which extend upwardly over a plane containing the tops (22) of the cells (20) and are provided with provisions (47) adapted for said battery assembly (10) to be carried around by or alternatively to be mounted in an end-use mounting environment.

17. The battery assembly (10) of claim 16 wherein the extension portions (45) are provided with apertures (47) for enabling said battery assembly (10) to be carried around by or alternatively to be mounted in the end-use mounting environment while also allowing said battery assembly (10) to form as dense as an array formation as possible with other like battery assemblies.

\* \* \* \* \*